United States Patent Office 3,025,281
Patented Mar. 13, 1962

3,025,281
PROCESS FOR POLYMERIZING VINYL ETHERS
Robert Chiang, Pittsburgh, Pa., assignor to Hercules
 Powder Company, Wilmington, Del., a corporation of
 Delaware
No Drawing. Filed July 19, 1960, Ser. No. 43,748
9 Claims. (Cl. 260—91.1)

This invention relates to an improved process for preparing poly(vinyl ethers) and more particularly to a process of preparing highly crystalline polymers in high yields.

It is well known that vinyl ethers can be polymerized in bulk or solution with Friedel-Crafts catalysts to yield polymers that vary from viscous liquid to balsam-like or soft resinous-like polymers. Under certain conditions and using boron trifluoride-etherates as catalysts it has been possible to produce a crystalline type of poly(vinyl methyl ether) and poly(vinyl isobutyl ether). In the case of both the balsam-like and crystalline-type poly(vinyl methyl ether) of the prior art, the polymer is completely soluble in cold water and in organic solvents such as methanol, ethanol, acetone and benzene. Because of the extreme solubility of these polymers, their utility has been considerably limited. More recently vinyl ethers have been polymerized to produce high molecular weight, frequently highly crystalline polymers which are insoluble in cold water, methanol, ethanol, n-heptane, etc. These polymers are particularly useful for films and fibers. However, they have been prepared chiefly by means of bulk or solution polymerization processes. Such polymerization techniques are undesirable from a commercial standpoint because of the difficulty in removing the heat of polymerization, the low conversion that can be tolerated because of the high viscosities at high conversion and the difficulties of recovering the product from a viscous medium.

Now it has been discovered that vinyl ethers can be polymerized by a precipitation or slurry polymerization process by using as the catalyst an alkylaluminum alkoxide that has been reacted with sulfuric acid. This catalyst is used in a reaction medium in which it is soluble, and in which the monomer is soluble, but in which the polymer that is produced is insoluble, whereby the polymer precipitates out during the polymerization and is then readily separated from the reaction medium and catalyst.

Accordingly, the present invention relates to a process of polymerizing a vinyl alkyl ether by a precipitation polymerization process, which comprises contacting a vinyl alkyl ether with a catalyst in an inert liquid organic diluent, which is a solvent for the ether and for the catalyst and a nonsolvent for the poly(vinyl alkyl ether) produced, said catalyst being the reaction product produced by reacting an aluminum compound having the formula $R_nAl(OR')_{3-n}$ where $n$ is 0 to 2, R is an alkyl radical and R' is an alkyl radical of at least 8 carbon atoms, with less than about ½ mole of sulfuric acid per mole of aluminum.

By this process it is possible to obtain greatly increased yields of polymer and, at the same time, the polymer that is produced is much more highly crystalline than previously obtained. Another advantage of this process is that the polymer precipitates in the form of fine particles and, hence, agitation of the reaction mixture is not impaired and the polymer slurry is readily separated from the liquid phase. This last advantage is most pronounced when the process is carried out by slowly adding the vinyl alkyl ether monomer either continuously or intermittently to a solution of the catalyst.

The catalyst used in this invention can be prepared by reacting a trialkylaluminum or an alkylaluminum hydride with an alcohol and then reacting this product with sulfuric acid. Alternatively, the catalyst can be prepared by reacting a trialkylaluminum with oxygen to form the intermediate aluminum alkyl alkoxide, which is then reacted with sulfuric acid. Just what is the active catalyst species is not known, but it appears to be a complex organic aluminum sulfate.

Any trialkylaluminum or alkylaluminum hydride can be reacted with an alcohol to produce the alkylaluminum alkoxide that is in turn reacted with sulfuric acid. Exemplary of such alkylaluminum compounds that can be used are triethylaluminum, diethylaluminum hydride, tripropylaluminum, triisopropylaluminum, triisobutylaluminum, diisobutylaluminum hydride, isobutylaluminum dihydride, tri(n-hexyl)aluminum, trioctylaluminum, tridodecylaluminum, tri(cyclohexyl)aluminum, etc.

The alcohols that can be reacted with the trialkylaluminum or alkylaluminum hydride are numerous and varied. Exemplary of the alcohols that can be used are 2-ethyl-1-hexanol, 1-octanol, 2-octanol, 1-dodecanol, 1-decanol, 1-undecanol, 2-decanol, etc. It is necessary to use a long chain alcohol to assure solubility of the final catalyst when the alkylaluminum alkoxide is reacted with sulfuric acid. Accordingly, the alcohol should contain at least 8 carbon atoms to assure the solubility of the final sulfuric acid reaction product and preferably 8 to 12 carbon atoms. The amount of alcohol that is reacted with the trialkylaluminum or alkylaluminum hydride can be varied from a molar ratio of alkylaluminum compound to alcohol of from about 1:1 to about 1:3, and preferably about 1:2.

The reaction between the alkylaluminum compound and alcohol is carried out in a liquid, inert, organic diluent in which both reagents and the product are soluble. Exemplary of suitable diluents are hydrocarbons such as hexane, heptane, cyclohexane, gasoline, benzene, toluene, ethylbenzene, exylene, cumene, mesitylene, etc., halogenated hydrocarbons, such as methylene chloride, chloroform, carbon tetrachloride, trichlorofluoromethane, 1,1-dichloroethane, trichloroethane, etc., ethers such as diethyl ether, furan, tetrahydrofuran, dioxane, etc., esters such as ethyl acetate, etc. The solubility of the reagents and reaction product of the alkylaluminum alkoxide with sulfuric acid depends on the diluent, alcohol, aluminum alkyl, temperature of the reaction and ratio of reactants. Hence, then diluent chosen for the reaction of the alkylaluminum compound and the alcohol will preferably be one suitable for the further reaction of the alkylaluminum alkoxide with sulfuric acid. The reaction between the alcohol and alkylaluminum compound is preferably carried out at low temperature, as for example, at room temperature and below. Usually a temperature of around 0° C. is used.

The product produced by the reaction of an alcohol with a trialkylaluminum or alkylaluminum hydride is a mixed alkylaluminum alkoxide and depending upon the ratio of the aluminum compound to alcohol can be a dialkylaluminum monoalkoxide or a monoalkylaluminum dialkoxide or is an aluminum trialkoxide or a mixture of these compounds. These compounds can then be said to have the general formula $R_nAl(OR')_{3-n}$ where $n$ is 0 to 2 and R is an alkyl, and R' is an alkyl radical containing at least 8 carbon atoms and preferably 8 to 12 carbon atoms. Obviously, then, the same compounds prepared by any other means can also be used in the preparation of the catalyst in accordance with this invention.

The aluminum alkoxide compound is then reacted with the calculated amount of sulfuric acid. Usually the molar ratio of acid to aluminum will be less than about ½, preferably from about ⅟₁₆ to about ½ and more preferably from about ⅛ to about ¼. The sulfuric acid can be used as the 100% acid or it can be used as a solution, of any concentration, in an anhydrous organic diluent. The sulfuric acid is added to the solution of the aluminum alkoxide, prepared as described above, with agitation at about 20° C. or below. The temperature at which this reaction is carried out appears to have an effect on the solubility behavior of the catalyst, catalysts prepared at 40° C. in n-heptane being only sparingly soluble while the same catalyst prepared at 0° C. is completely soluble. True solutions containing as high as 20 g. of the catalyst in 100 ml. of solution can be prepared by this means. The catalyst is preferably used at once or stored, until used, at low temperature as, for example, at 0° C. to −25° C.

The polymerization of the vinyl ether with this soluble catalyst can be carried out in any liquid, inert organic diluent or mixture of such diluents in which the catalyst and monomer are soluble and in which the poly(vinyl ether) is insoluble. Exemplary of such diluents are cycloalkanes such as cyclohexane, aliphatic hydrocarbons or mixtures thereof such as heptane, ether, ethyl acetate, trichlorofluoromethane, etc., or mixtures of a solvent such as methylene chloride, ethylene chloride, benzene, etc., with a nonsolvent such as heptane, etc., in which mixture of diluents the polymer is insoluble. Particularly effective as a diluent for this polymerization process is a mixture of methylene chloride and n-heptane containing at least about 10% methylene chloride, higher yields of crystalline polymer being obtained when the mixed diluent contains 20% or more methylene chloride, but the higher the methylene chloride content of the mixture, the lower the temperature of the polymerization must be to assure the insolubility of the polymer in the diluent.

While the polymerization can be carried out over a wide temperature range, the yield of crystalline polymer and/or polymers with other improved properties are obtained when the polymerization is carried out at relatively low temperature. In general, a temperature of from about −80° C. to about 25° C. is used, depending upon the type of diluent used, solubility of the catalyst in the diluent at that temperature, etc., and preferably a temperature of about 0° C. or less is used. The pressure at which the polymerization is carried out can vary from subatmospheric to superatmospheric pressures of 1000 pounds or more, but generally the process is carried out at about atmospheric pressure. Obviously many variations can be made in the polymerization technique, for example, the polymerization can be carried out as a batch or continuous operation and the monomer and catalyst can be added together or separately with one or both being added continuously, incrementally or all at one time. Preferably, when a finely divided polymer is the primary object, the monomer is slowly and continuously added to a solution of the catalyst. Continuous addition of monomer can, of course, be approximated by intermittent addition of small portions of monomer.

Any vinyl ether can be polymerized by the process in accordance with this invention as, for example, vinyl alkyl ethers, vinyl cycloalkyl ethers, vinyl aralkyl ethers or vinyl aryl ethers, and the corresponding propenyl ethers, etc. Exemplary of these ethers that can be so polymerized are the vinyl alkyl ethers such as vinyl methyl ether, vinyl ethyl ether, vinyl 2-chloroethyl ether, vinyl 2-methoxyethyl ether, vinyl 2-cyanoethyl ether, vinyl propyl ether, vinyl isopropyl ether, vinyl n-butyl ether, vinyl isobutyl ether, vinyl tert-butyl ether, vinyl neopentyl ether, vinyl n-hexyl ether, vinyl 2-ethylhexyl ether, vinyl stearyl ether, etc., the vinyl cycloalkyl ethers such as vinyl cyclohexyl ether, vinyl α-terpinyl ether, vinyl isobornyl ether, etc., the vinyl aralkyl ethers such as vinyl benzyl ether, vinyl p-chlorobenzyl ether, vinyl α,α-dimethylbenzyl ether, etc., and the vinyl aryl ethers such as vinyl phenyl ether, vinyl p-methylphenyl ether, vinyl p-chlorophenyl ether, vinyl α-naphthyl ether, etc., and the corresponding propenyl ethers, etc. Any mixture of these vinyl ethers can likewise be so polymerized.

The amount of the alkylaluminum alkoxide-sulfuric acid catalyst used for the polymerization will vary from at least a catalytic amount to any desired amount but generally will be within the range of from about 0.0001 mole to about 0.05 mole and preferably from about 0.002 mole to about 0.02 mole of aluminum per mole of monomer.

In addition to the catalyst, it is frequently desirable to add an acitvator to the polymerization reaction mixture whereby improved results are obtained. Compounds which are effective activators for this polymerization process are the aluminum alkoxides as, for example, aluminum isopropoxide, aluminum butoxide, etc., aluminum trialkyls such as triethylaluminum, triisobutylaluminum, etc., or their molar complexes with an ether such as tetrahydrofuran, etc., and alkylaluminum alkoxides. Just how these so-called "activators" act is not known. In some cases they probably inactivate deleterious impurities such as water, etc. At any rate, improved results in yield of crystalline polymer and/or crystallinity of the polymer are generally obtained when the activator is added. When used, it is preferably added to the inert liquid organic diluent first, i.e., prior to the addition of the catalyst. The amount of the activator added can be varied widely, but generally will be from about 0.001 to about 0.05 mole per mole of monomer.

Following examples will illustrate the process of polymerizing vinyl ethers in accordance with this invention. The molecular weight of the polymers produced in these examples is indicated by the reduced specific viscosity (RSV) given for each. By the term "reduced specific viscosity" is meant the $\eta sp/c$ determined on an 0.1% solution (0.1 g. of the polymer per 100 ml. of solution) of the polymer in chloroform at 25° C. All parts and percentages are by weight unless otherwise specified.

EXAMPLES 1–5

*Preparation of the Catalyst*

The catalysts used in these examples were prepared by adding 2-octanol to a solution of trialkylaluminum in an inert organic solvent such as heptane, methylene chloride, a mixture of aliphatic hydrocarbons or benzene at 0° C. then allowing the reaction mixture to stand at room temperature for about 1 hour to complete the reaction. The trialkylaluminum-(2-octanol) reaction mixture was diluted with heptane, cooled to about 0° C. to −25° C. and then 100% sulfuric acid was added with vigorous shaking. A typical preparation was carried out as follows:

To 10 ml. of a 1.66 M solution of triethylaluminum in a mixture of aliphatic hydrocarbons and held at 0° C. was added 5.30 ml. of 2-octanol during about 10 minutes. The reaction mixture was held at room temperature for 1 hour with occasional release of the ethane formed during the reaction. At the end of the reaction, the mixture was diluted to approximately 30 ml. with anhydrous heptane and with the temperature at −25° C., 0.13 ml. of 100% sulfuric acid was introduced with vigorous shaking. Fine needles were seen at the moment of the addition of sulfuric acid but immediately went into complete solution. The catalyst so produced was designated as a 1:2:⅙ triethylaluminum-(2-octanol)-sulfuric acid catalyst.

*Polymerization*

In each case the polymerization vessel with a nitrogen atmosphere was charged with 7.5 parts of methyl vinyl ether and a mixture of methylene chloride and heptane in the specified ratio by volume (35 to 65 parts depending upon the composition of the mixture) and with the temperature of the reaction mixture held at 0° C. in Examples 1 and 5 and at −25° C. in Examples 2 to 4, 0.114 part of the specified triethylaluminum-(2-octanol)- sulfuric acid catalyst (based on the aluminum) was added and 0.102 part of aluminum isopropoxide was then added as activator. After 16 hours in Examples 1, 4 and 5 and 24 hours in Examples 2 and 3, the polymerization was stopped by adding 4 parts of a dilute solution of ammonia in methanol. In order to prevent any polymer degradation, there was then added 0.025% based on the weight of the polymer of 4,4'-thiobis(6-tert-butyl-m-cresol). The methylene chloride in the reaction mixture was removed under vacuum and the solid polymer was recovered from the heptane by filtration and designated as heptane-insoluble poly(vinyl methyl ether). In each case it was in a finely divided state. It was then dried at room temperature and extracted twice with 100 ml. portions of cold methanol in a Waring Blendor. The ratio of the methanol-insoluble (I) to the methanol-soluble (S) polymer that was present in the heptane-insoluble polymer was then determined.

In Table I is set forth the ratio of methylene chloride to heptane used as the diluent, the polymerization temperature, the molar ratio of triethylaluminum to 2-octanol to sulfuric acid in the catalyst and the total conversion to heptane-insoluble polymer. Also set forth is the ratio of methanol-insoluble to methanol-soluble polymer (I/S) produced in the process along with the RSV and percent crystallinity of the crystalline, methanol-insoluble, poly(vinyl methyl ether) so produced. The series of polymerizations in Examples 1 to 3 demonstrate that the ratio of sulfuric acid to triethylaluminum is not critical between the limits of 1:½ to 1:1/16 and that more important is the ratio of 2-octanol to triethylaluminum in the catalyst as can be seen by comparing the total conversion in each case along with the ratio of methanol-insoluble to methanol-soluble polymer present. Example 4 demonstrates the effect of varying the diluent from 100% heptane up to 100% methylene chloride. In the case of 100% heptane diluent the yield of polymer was poor and it was not possible to accurately determine the ratio of methanol-insoluble to methanol-soluble polymer. In the range of 20% to 100% methylene chloride there was essentially no effect upon the ratio of methanol-soluble to methanol-insoluble polymer produced in the polymerization reaction, but there was a slight decrease in the overall yield of the polymer as the percentage of methylene chloride increased. Example 5 is a comparison of the process operated with and without the addition of an activator, none being added to 4a and 0.102 part of aluminum isopropoxide added in 4b.

TABLE I

| Ex. | Diluent $CH_2Cl_2$, heptane | Polym. temp. °C. | Catalyst, molar ratio $Al(C_2H_5)_3$, 2-octanol, $H_2SO_4$ | Total conv., percent | I/S | PVME—C | |
|---|---|---|---|---|---|---|---|
| | | | | | | RSV | Percent crystl. |
| 1a | 20:80 | 0 | 1:2:1/10 | 98 | 2.1 | | |
| 1b | 20:80 | 0 | 1:3:1/10 | 86 | 1.3 | | |
| 1c | 20:80 | 0 | 1:2:⅛ | 89 | 2.2 | | |
| 1d | 20:80 | 0 | 1:3:⅛ | 73 | 1.1 | | |
| 2a | 20:80 | −25 | 1:2:1/16 | 95 | 2.0 | | |
| 2b | 20:80 | −25 | 1:2:⅛ | 97 | 2.8 | | |
| 2c | 20:80 | −25 | 1:2:¼ | 90 | 2.1 | | |
| 2d | 20:80 | −25 | 1:2:½ | 86 | 2.4 | | |
| 2e | 20:80 | −25 | 1:2:⅔ | 87 | 1.5 | | |
| 3a | 20:80 | −25 | 1:0.5:⅛ | 9 | 0.9 | | |
| 3b | 20:80 | −25 | 1:1:⅛ | 96 | 1.6 | | |
| 3c | 20:80 | −25 | 1:2:⅛ | 85 | 2.1 | | |
| 3d | 20:80 | −25 | 1:3:⅜ | 60 | 0.9 | | |
| 4a | 0:100 | −25 | 1:2:⅛ | | | | |
| 4b | 10:90 | −25 | 1:2:⅛ | 94 | 2.9 | 6.2 | |
| 4c | 20:80 | −25 | 1:2:⅛ | 93 | 4.6 | 7.2 | |
| 4d | 30:70 | −25 | 1:2:⅛ | 93 | 4.3 | 8.3 | |
| 4e | 50:50 | −25 | 1:2:⅛ | 82 | 4.5 | 9.8 | |
| 4f | 100:0 | −25 | 1:2:⅛ | 73 | 4.0 | 7.2 | |
| 5a | 20:80 | 0 | 1:2:⅛ | 90 | 1.7 | 12.1 | 32 |
| 5b | 20:80 | 0 | 1:2:⅛ | 85 | 2.1 | 13.9 | 36 |

EXAMPLE 6

Vinyl methyl ether (300 parts) was polymerized by the procedure described in Examples 1–5 using as the diluent an 80:20 (by volume) mixture of heptane and methylene chloride and as catalyst, the reaction product of triethylaluminum with 2-octanol (1:2 molar ratio) reacted with ⅛ mole of sulfuric acid ($Al(C_2H_5)_3$:2-octanol: $H_2SO_4$ of 1:2:⅛). The polymerization was carried out at −25° C. for 4–5 hours with agitation. The catalyst was deactivated by the addition of ethanolic ammonia. The reaction mixture was then filtered and the polymer so isolated was washed first with hot aqueous caustic to remove catalyst residues, then with hot water and finally was extracted with methanol at room temperature.

The methanol-insoluble poly(vinyl methyl ether) amounted to 85% of the total polymer (total conversion was about 80%). It had a melting point of 128° C., density of 1.077, RSV of 16.9, crystallinity of 35% by infrared, was 0.24% soluble in water with 88% water absorption. Film prepared from this polymer had a tensile strength of 2300 p.s.i., tensile modulus of 8500 p.s.i., maximum elongation of 310%, and a yield stress of 765 p.s.i.

EXAMPLE 7

Example 6 was repeated except that after the hot water wash of the crude polymer it was washed with cold water. The total conversion was the same, but 90% of the polymer was insoluble in cold methanol. The poly(vinyl methyl ether) so obtained had a melting point of 126° C., a density of 1.079, an RSV of 15.9 and had a crystallinity of 30% as measured by infrared, and was 0.50% soluble in water with a water absorption of 95%. Film prepared from this polymer had a tensile strength of 2300 p.s.i., tensile modulus of 7200 p.s.i., maximum elongation of 300%, yield stress of 750 p.s.i., a moisture vapor transmission of 2090 (g./m.$^2$/24 hrs./mil) at 100° F. and a difference in relative humidity of 90%/0% through the film and an oxygen permeability of 320 (cc./100 cm.$^2$/24 hrs./mil/atm.) at 23° C. and 0% relative humidity.

EXAMPLE 8

A polymerization vessel with a nitrogen atmosphere was charged with 27.4 parts of heptane and 13.4 parts of methylene chloride, and with the temperature of the mixture held at −25° C., 2 parts of a heptane solution of the 1:2:⅛ triethylaluminum-(2-octanol)-sulfuric acid catalyst (0.5 M in Al and 0.0624 M in $SO_4$) were added. Then 7.5 parts of vinyl methyl ether were distilled into the mixture at a rate of 0.075 g./hr./ml. of diluent for a period of 2 hours. Four hours after the addition of the monomer had started, the polymerization was quenched by adding 3.9 parts of a 5% ethanolic ammonia solution. The volatile materials were removed by evaporation under vacuum and 3.4 parts of finely divided solid polymer were recovered from the heptane by filtration. The heptane-insoluble polymer was extracted with methanol at room temperature. The methanol-insoluble poly(vinyl methyl ether) amounted to 65% of the total polymer. It had an RSV of 8.4 and a crystallinity of 31% by infrared.

EXAMPLE 9

A polymerization was conducted as described in Example 8 except that the vinyl methyl ether was added at a rate of 0.3 g./hr./ml. of diluent for a period of 5 hours. The polymerization was allowed to proceed an additional 16 hours and then was quenched with a 5% ethanolic ammonia solution. The volatile materials were removed by distillation at reduced pressure and simultaneously replaced with water. The resulting slurry of finely divided polymer particles was allowed to stand at room temperature overnight, filtered, washed with water and then twice with 2% aqueous caustic.

The water-insoluble poly(vinyl methyl ether) amounted to 82% of the total polymer (total conversion was about 74%). It had an RSV of 6.7, 32% crystallinity by infrared and a polymer ash content of 0.02 weight percent.

As can be seen from the foregoing examples, the process of this invention makes it possible to produce poly (vinyl methyl ether) in high conversion to a cold methanol-insoluble polymer in high yields and of high crystallinity, generally in the order of 25–30% when the process is carried out at around 0° C. and slightly higher at lower temperatures, as for example, about 30–35% at −25° C. The RSV can be varied from about 6 to about 20 by variations in the process. The poly(vinyl methyl ether) so produced had a melting point generally within the range of 120–130° C. for the cold methanol-insoluble polymer and it is soluble in benzene, methylene chloride, chloroform and dimethylformamide and insoluble in water, ether, ethyl acetate and heptane. Fractionation of the cold methanol-insoluble polymer with boiling methanol has yielded a polymer insoluble in hot methanol that has a melting point of 146° C. and a crystallinity of 64%.

This application is a continuation-in-part of my application Serial No. 843,365, filed September 30, 1959, now abandoned.

What I claim and desire to protect by Letters Patent is:

1. The process of polymerizing a vinyl alkyl ether by a precipitation polymerization process which comprises contacting a vinyl alkyl ether in which the alkyl portion contains from about 1 to about 18 carbon atoms with a catalyst in an inert liquid organic diluent which is a solvent for the ether and for the catalyst and a nonsolvent for the poly(vinyl alkyl ether) produced, said catalyst being the reaction product produced by reacting an aluminum compound having the formula $R_nAl(OR')_{3-n}$ where $n$ is 0 to 2, R is an alkyl radical and R′ is an alkyl radical containing from 8 to 12 carbon atoms, with from about $\frac{1}{16}$ to about $\frac{1}{2}$ mole of sulfuric acid per mole of aluminum.

2. The process of claim 1 wherein there is added as an activator for the polymerization an aluminum trialkoxide.

3. The process of claim 1 wherein vinyl methyl ether is polymerized.

4. The process of claim 3 wherein the diluent is a mixture of methylene chloride and n-heptane containing at least about 10% by volume of methylene chloride.

5. The process of claim 4 wherein the aluminum compound is that produced by reacting a trialkylaluminum with from about 1 to about 3 moles of a primary aliphatic alcohol containing from 8 to 12 carbon atoms.

6. The process of claim 5 wherein the catalyst is the reaction product produced by reacting triethylaluminum with n-octanol at a molar ratio of 1:1 to 1:3, respectively, and then reacting the ethylaluminum octoxide so produced with from about $\frac{1}{16}$ to about $\frac{1}{2}$ mole of sulfuric acid per mole of aluminum at a temperature of from about −80° C. to about 20° C.

7. The process of claim 1 wherein the vinyl alkyl ether is slowly and continuously added to the catalyst in an inert liquid organic diluent.

8. The process of polymerizing vinyl methyl ether which comprises contacting vinyl methyl ether with a catalyst in a methylene chloride-n-heptane diluent containing at least about 20% methylene chloride, said catalyst prepared by reacting one mole of triethylaluminum with about two moles of n-octanol at a temperature below about 0° C. and adding to the reaction product from about $\frac{1}{8}$ to about $\frac{1}{4}$ mole of sulfuric acid at a temperature below about 0° C.

9. The process of claim 8 wherein aluminum isopropoxide is added as an activator for the polymerization.

References Cited in the file of this patent

UNITED STATES PATENTS 2,827,447  Nowlin et al. _____ Mar. 18, 1958